March 16, 1954 R. L. STEVENSON 2,672,531
AUTOMOBILE LIGHTING CONTROL SYSTEM SWITCH
Filed July 19, 1950 3 Sheets-Sheet 1

INVENTOR.
Robert L. Stevenson
BY
Hamilton + Hamilton
Attorneys.

March 16, 1954  R. L. STEVENSON  2,672,531
AUTOMOBILE LIGHTING CONTROL SYSTEM SWITCH
Filed July 19, 1950  3 Sheets-Sheet 2

INVENTOR.
Robert L. Stevenson
BY Hamilton & Hamilton
Attorneys.

March 16, 1954 R. L. STEVENSON 2,672,531
AUTOMOBILE LIGHTING CONTROL SYSTEM SWITCH
Filed July 19, 1950 3 Sheets-Sheet 3

INVENTOR.
Robert L. Stevenson
BY
Hamilton + Hamilton
Attorneys.

Patented Mar. 16, 1954

2,672,531

UNITED STATES PATENT OFFICE 2,672,531

AUTOMOBILE LIGHTING CONTROL SYSTEM SWITCH

Robert L. Stevenson, Overland Park, Kans.

Application July 19, 1950, Serial No. 174,597

2 Claims. (Cl. 200—4)

1

This invention relates to new and useful improvements in automobile lighting systems, and relates particularly to a system for controlling the external lights of an automobile.

The principal object of this invention is the provision of an automobile lighting system wherein a single control handle controls the parking lights, driving lights and turn indicator lights.

Another object is the provision, in an automobile lighting circuit including headlights, a pair of front parking lights, and a pair of tail lights, of control means operable by a single handle to turn said lights off, to turn on the parking and tail lights, or to turn on the head lights and tail lights, and also to cause said parking lights and tail lights to blink selectively and thus to act as turn indicating lights.

Other objects are simplicity and economy of construction, efficiency and dependability of operation; and adaptability for use in various other lighting circuits.

With these objects in view, as well as other objects which will appear in the course of the specification, reference will be had to the drawing, wherein:

Fig. 12 is a partially schematic diagram of the

Figure 1:
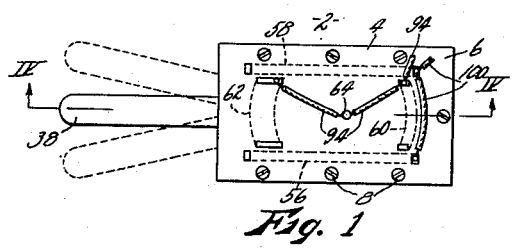
Figure 1 is a plan view of the electric switch comprising the central feature of this invention, showing the control handle in the off position in solid lines and in the positions for actuating the turn indicating lights in dotted lines.
Figure 2:
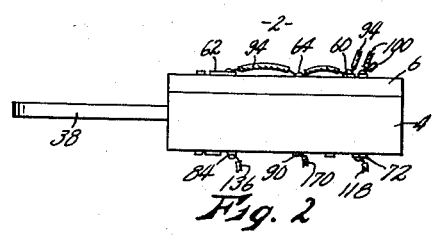
Fig. 2 is a side elevation of the switch shown in Fig. 1.
Figure 3:
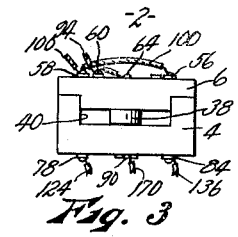
Fig. 3 is a front elevation of the switch shown in Fig. 1.
Figure 4:
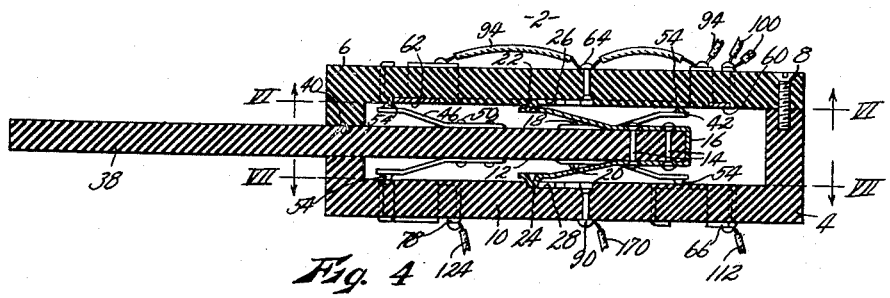
Fig. 4 is an enlarged section taken on line IV—IV of Fig. 1, showing the switch in the open position.
Figure 5:
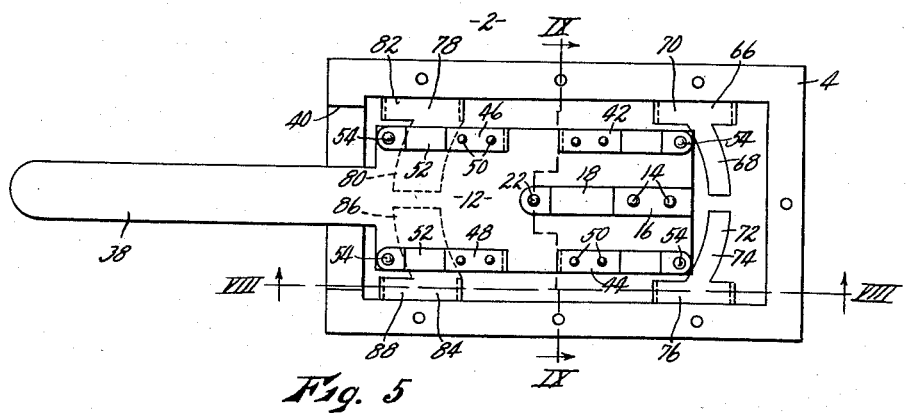
Fig. 5 is a plan view of the switch as shown in Fig. 4, with the cover removed.

2 entire electrical circuit, including a lay-out view of the control switch.

Like reference numerals apply to similar parts throughout the several views, and the numeral 2 applies to a control switch device including a housing 4 made of an insulating material such as a suitable plastic and comprising a shallow rectangular box having a cover 6, also formed of an insulating material, attached thereto by any suitable means such as screws 8. The inner surface of said cover and the inner surface of the bottom 10 of the housing respectively form upper and lower contact plates, contact members being set therein as hereinafter described.

Figure 6:
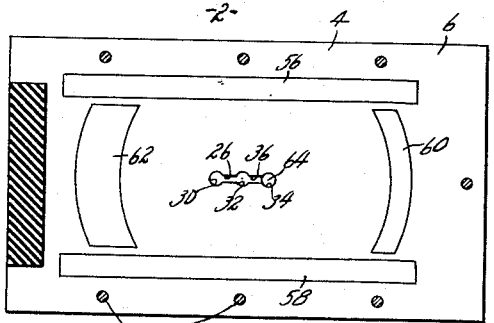
Fig. 6 is a sectional view taken on line VI—VI of Fig. 4, showing a face view of the upper contact plate.
Figure 7:
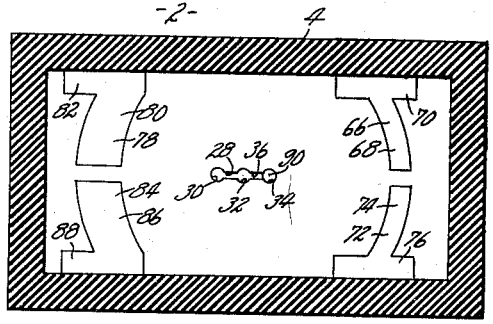
Fig. 7 is a sectional view taken on line VII—VII of Fig. 4 showing a face view of the lower contact plate.

Mounted between said contact plates, and parallel thereto, is a switch plate 12 formed of an insulating material and having a substantially rectangular form. Fixed to said switch plate by rivets 14 is a strip of resilient conducting material 16 formed to present resilient arms 18 and 20 extending respectively upwardly and downwardly from said switch plate. Adjacent its free end, arm 18 is formed to present an upwardly extending contact boss 22, and arm 20 is correspondingly formed to present a downwardly extending contact boss 24. Said contact bosses are disposed in a line at right angles to plate 12, and are urged outwardly from said plate by the resilience of strip 16 to engage corresponding recesses 26 and 28 formed respectively in cover 6 and bottom 10. As best shown in Figs. 6 and 7, said recesses are identical, and each comprises three circular recesses 30, 32, and 34 arranged in line longitudinally of the housing and connected by a slot 36 somewhat narrower than the diameter of the circular recesses.

Thus it is apparent that switch plate 12 is supported between cover 6 and bottom 10 for pivotal movement about an axis extending through contact bosses 22 and 24, and also may be moved longitudinally in the housing to any of three positions in which said bosses engage circular recesses 30, 32, and 34. The bosses are guided by slot 36 as they move between the circular recesses, and snap outwardly to act as detents to selectively engage said circular recesses to hold the switch plate releaseably in any of its three longitudinal positions. Said switch plate may be manually manipulated to provide either longitudinal or pivotal movement, by means of an extension thereof forming an operating handle 38. Said handle extends outwardly from the housing through a slot 40 formed in the end wall of the housing. The dimensions of switch plate 12 are sufficiently less than the internal dimensions of the housing to permit the above described pivotal and longitudinal movement.

Figure 8:
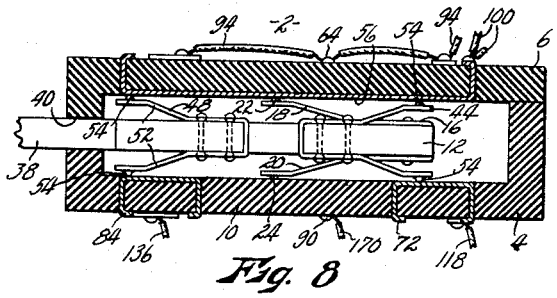
Fig. 8 is a fragmentary sectional view taken on line VIII—VIII of Fig. 5.
Figure 9:
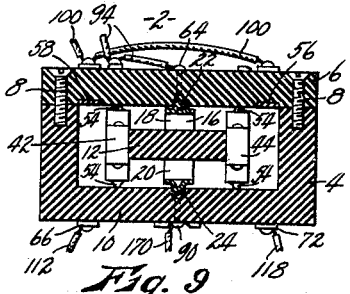
Fig. 9 is a sectional view taken on line IX—IX of Fig. 5.

Attached to switch plate 12, respectively adjacent each of the four corners thereof, are four resilient contact strips 42, 44, 46, and 48 similar to contact strip 16, being attached to said switch plates by rivets 50 and, as best shown in Fig. 8, each being formed to present a pair of resilient arms 52 extending respectively upwardly and downwardly from said switch plate, and each of said arms being formed to present an outwardly extending contact boss 54. The bosses 54 of each contact strip lie in a line perpendicular to plate 12, and are urged resiliently outwardly to rest in sliding contact with cover 6 and bottom 10.

Fig. 6 shows the contacts carried by cover 6. A pair of straight parallel contact strips 56 and 58 are recessed and lie flush with the inner surface of cover 6. Said contact strips are arranged longitudinally of the housing, and spaced apart a distance somewhat greater than the width of switch plate 12. A contact strip 60 having the form of an annular segment is arranged between corresponding end portions of strips 56 and 58, and is approximately concentric with the central recess 26 of cover 6. Another contact strip 62 also having the form of an annular segment, but somewhat wider than strip 60, is arranged between the opposite corresponding end portions of strips 56 and 58, and is substantially concentric with recess 26. All of contact strips 56, 58, 60, and 62 are recessed in and lie flush with the inner surface of cover 6, and are securely fixed therein by any suitable means. A rivet 64 is fixed in said cover and the head thereof is disposed in the base of circular portion 34 of recess 26, so as to be contacted by boss 22 of contact strip 16 when the switch plate 12 is moved to position said boss in portion 34 of the recess.

Fig. 7 shows the contact members fixed in bottom 10 of the housing, said contact members being recessed in to lie flush with the inner surface of said bottom. Contact strip 66 comprises an annular section 68 lying directly beneath and corresponding to contact strip 60 in the cover, though not extending to the longitudinal centerline of the switch, and a straight section 70 lying directly beneath and corresponding to contact strip 58 in the cover. Contact strip 72 comprises an annular section 74 lying directly beneath and corresponding to contact strip 60 in the cover, and a straight section 76. Contact strip 78 comprises an annular section 80 lying directly beneath and corresponding to contact strip 62 in the cover, though not extending to the longitudinal centerline of the switch, and a straight section 82 lying directly beneath and corresponding to contact strip 58 in the cover. Contact strip 84 comprises an annular section 86 lying directly beneath and corresponding to contact strip 62 in the cover, and a straight section 88 lying directly beneath and corresponding to contact strip 56 in the cover. A rivet 90 is fixed in bottom 10 of the housing, the head of said rivet being disposed in the base of circular portion 34 of central recess 28 of housing bottom 10, so as to be engaged by boss 24 of contact strip 16 whenever switch plate 12 is moved to cause said boss to engage recess 34.

Figure 12:
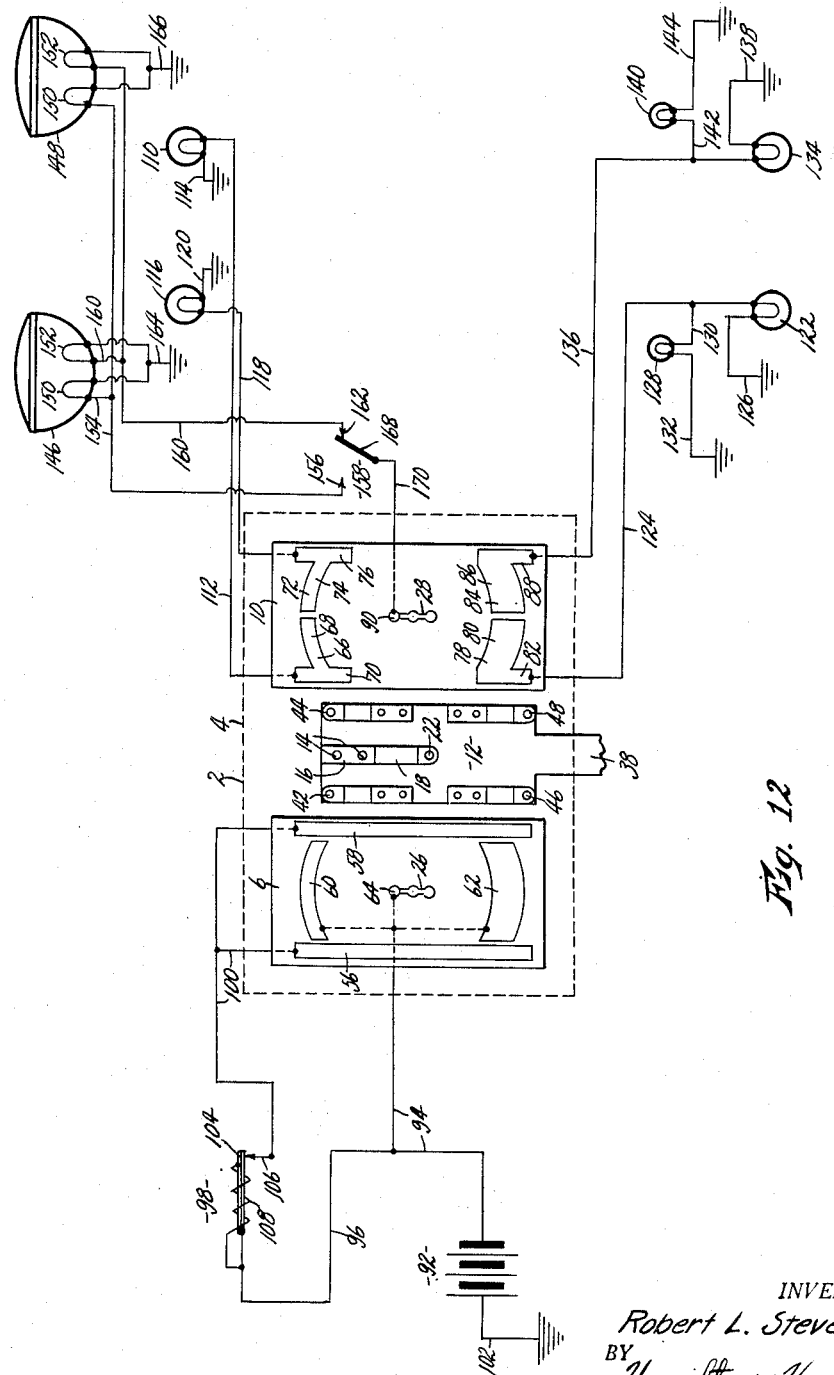

Referring to the wiring diagram shown in Fig. 12, it will be noted that annular contact strips 60 and 62 in the cover, and rivet 64 in the cover, are connected to the automobile battery 92 by wire 94, and that contact strips 56 and 58 of the cover are connected to the battery through wire 94, wire 96, blinker switch 98, and wires 100. The other terminal of the battery is grounded by wire 102. Blinker switch 98 may be of any suitable construction, but as shown comprises a bimetallic switch member 104 normally engaging contact 106 to close the switch when not heated. A heating coil 108 surrounds the switch member, and is connected in parallel therewith. When current is fed to the switch member 104, causing it to deform and move away from contact 106, thereby opening the switch. Thereupon the switch member cools and again engages contact 106 to re-establish the circuit, and the cycle is repeated.

Contact strip 66 in the housing bottom is connected to the right parking lamp 110 of the automobile by wire 112, the other terminal of said lamp being grounded by wire 114. Contact strip 72 is connected with the left parking lamp 116 of the automobile by wire 118, the other terminal of said lamp being grounded by wire 120. Contact strip 78 is connected to the left tail lamp 122 of the automobile by wire 124, the other terminal of said lamp being grounded by wire 126. A left indicator lamp 128 has its one terminal connected to wire 124 by wire 130 and its other terminal grounded by wire 132. Contact strip 84 is connected to the right tail lamp 134 by wire 136, the other terminal of said lamp being grounded by wire 138. A right indicator lamp 140 has its one terminal connected to wire 136 by wire 142, and its other terminal grounded by wire 144.

Each of the head lamps 146 and 148 of the automobile is equipped with a bright filament 150 and a dim filament 152. One terminal of each filament 150 is connected by wires 154 with one of the fixed contacts 156 of a double-throw switch 158. One terminal of each of the filaments 152 is connected by wires 160 to the other fixed contact 162 of switch 158. The second terminal of each of filaments 150 and 152 is grounded as at 164 and 166. The movable pole 168 of switch 158 is connected by wire 170 to rivet 90. By moving pole 168 to engage either contact 156 or 162, it is apparent that either the bright filaments 150 or the dim filaments 152 may be placed in use. Switch 158, commonly known as a "dimmer switch," is usually foot-operated and positioned for convenient operation by the driver of the automobile.

The operation of the system is substantially as follows: The control switch 2 and the indicator lamps 128 and 140 are mounted on the dashboard, steering column, or other portion of the automobile conveniently accessible to the driver. When operating handle 38 is pulled outwardly from housing 4, and positioned parallel with the longitudinal axis of the switch, the parts will have the relative positions shown in Figs. 4, 5, 8, and 9, bosses 22 and 24 central contact strip 16 of switch plate 12 resting in circular portions 30 of the recesses 26 and 28 of the cover 6 and housing bottom 10. In this position it is evident that none of the automobile lights will be lighted, since contact strip 16 does not contact rivets 64 and 90, and since the switch plate contact strips 42, 44, 46, and 48 do not contact any of the contact strips of the housing. This is the normal position of the switch for daylight driving. When it is desired to signal for a left turn, handle 38 is pivoted to the left, as shown in dotted lines in Fig. 1. Contact strip 44 of switch plate 12 is thereby caused to establish contact between contact strip 56 carried by the cover and straight portion 76 of contact strip 72 carried by bottom 10, thereby establishing a circuit from battery 92 through wires 94 and 96, blinker switch 98, wire 100, contact strips 56, 44, and 72, and wire 118 to left front parking light 116, whereby said light will be caused to blink regularly. Simultaneously contact strip 46 of the switch plate will establish contact between contact strip 58 of the cover and straight portion 82 of contact strip 78 carried by bottom 10, thereby completing a circuit from battery 92 through wires 94 and 96, blinker switch 98, wire 100, contact strips 58, 46, and 78, and wire 124 to left tail light 122, and also through wire 130 to left indicator lamp 128, causing both said tail light and said indicator lamp to blink regularly. Contact strips 42 and 48 of the switch plate will not engage any of the contact strips carried by the housing, and hence the right front parking light and the right tail light and indicator lamp will remain off.

When it is desired to signal for a right turn, handle 38 is pivoted to the right, as shown in dotted lines in Fig. 1, whereupon switch plate contact strips 42 engages contact strip 66 to establish a circuit to right front parking light 110 through wire 112, and contact strip 48 engages contact strip 84 to establish a circuit to right tail light 134 and right indicator lamp 140 through wires 136 and 142. It is apparent that when switch plate is pulled outwardly to bring bosses 22 and 24 into engagement with recesses 30, the parking and tail lights can only be turned on blinker, since the switch plate contact strips 42, 44, 46, and 48 through which connections are made to said lamps, can engage only contact strips 56 and 58 in the cover, said last named contact strips drawing current from the battery through blinker switch 98.

Figure 10:
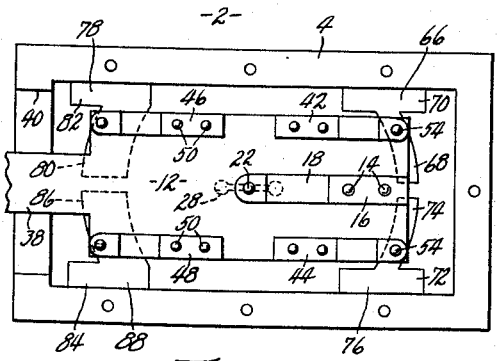
Fig. 10 is a view similar to Fig. 5, showing the switch positioned to turn on the parking lights.

When it is desired to turn on the parking lights and tail lights, as commonly used when parking the automobile and in twilight driving, handle 38 is pushed manually inwardly until bosses 22 and 24 of switch plate contact strip 16 engage the central circular portions 32 of the recesses 26 and 28 formed in cover 6 and bottom 10. The parts then have the position shown in Fig. 10. Switch plate contact strips 42 and 44 establish contact between cover contact strip 60 and the annular portions 68 and 74 of bottom contact strips 66 and 72. Thus current flows from battery 92 through wire 94, contact strips 60, 66, and 72, and wires 112 and 118 to parking lamps 110 and 116. Likewise, switch plate contact strips 46 and 48 connect cover contact strip 62 with the annular portions 80 and 86 of bottom contact strips 78 and 84 thereby providing current to tail lights 122 and 134 through wires 124 and 136 and to indicator lamps 128 and 140 through wires 130 and 142. All of the parking lights, tail lights, and indicator lights burn steadily, since blinker switch 98 is not in the circuit.

Figure 11:
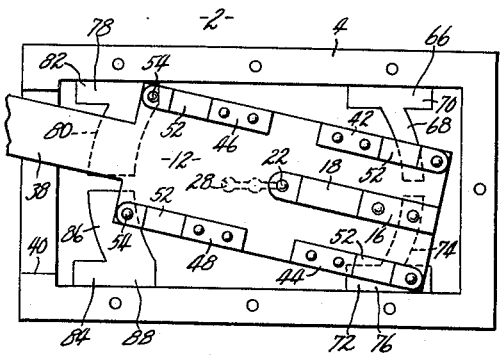
Fig. 11 is a view similar to Fig. 5, showing the switch positioned to turn on the driving lights, and to indicate a left turn.

When it is desired to turn the driving lights on, handle 38 is pushed inwardly until bosses 22 and 24 of the switch plate contact strip 16 engage the circular portions 34 of the recesses 26 and 28. Said bosses thus contact the heads of rivets 64 and 90, establishing a circuit from battery 92 through wire 94, rivet 64, contact strip 16, rivet 90, wire 170, switch 158 and thence through either wire 154 or wire 160 to head lamp filaments 150 or 152. As indicated in Fig. 11, switch plate contact strips remain in engagement with cover contact strip 62 and the annular portions of bottoms contact strips 78 and 84, since these contact strips are relatively broad in a direction longitudinal to the switch. The tail lights and indicator lights thus remain lighted. However, switch plate contact strips 42 and 44 pass out of engagement with cover contact strip 60 and the annular portions of bottom contact strips 66 and 72, since said last named strips are relatively narrow in a direction longitudinal to the switch. The front parking lights are thus normally not lighted during night driving. However, it is apparent that when the switch plate is positioned longitudinally for either parking or night driving lights, the front parking lights and the tail lights may be caused to blink on and off to signal turns, simply by pivoting handle 38 to the left or right as described above. Whenever the handle is pivoted in either direction, the switch plate contact strips corresponding to either the left or right lights will engage the contact strips 56 and 58, and thus draw current through the blinker switch. The contact strips 56 and 58, and the corresponding portions of contact strips 66, 72, 78, and 84, are sufficiently long to engage the switch plate strips whenever said switch plate is pivoted, regardless of the longitudinal position of said switch plate. The indicator lamps 128 and 140 serve to indicate both whether any of the external lights of the automobile are lighted, and the direction for which a turn is being signaled.

The switch would of course function in the same manner if the contact strips in the bottom 10 of the housing were not shaped similarly to the contact strips in the cover, but were such as to engage the switch plate contact strips at all times. Or the connections to the load side of the switch plate could be permanent and fixed, if flexible wires were used. However, the arrangement shown has the advantage of providing a double break in the circuit at each connection, thereby protecting against damage due to possible short circuiting.

The principal feature of this invention is the inclusion in a single lever or switch the complete control of all of the external lights of an automobile, including parking, night driving, and turn signalling lights. The device is also simple, economical, and efficient, and the switch 2 forming the central feature thereof may be installed in the lighting system of most present automobiles without extensive or expensive rewiring.

While I have shown a specific embodiment of my invention, it is apparent that many minor changes of construction and operation could be made without departing from the spirit of the invention.

What I claim is:

1. A control switch comprising a housing, a planar rectangular switch plate carried by said housing for longitudinal movement and for pivotal movement about a central axis at right angles to its plane, the longitudinal axes of said housing and said switch plate normally being parallel, a contact strip carried by said switch plate at each of the four corners thereof, a pair of annular segmental contact strips carried by said housing in a plane parallel to said switch plate, said annular contact strips being approximately concentric with and disposed on opposite sides of the pivotal axis of said switch plate, said annular contact strips also being disposed within the normal transverse span of said switch plate and respectively adjacent the opposite ends thereof, the annular contact strip corresponding to one end of the switch plate being wider than the other annular strip whereby longitudinal movement of said switch plate will selectively move said switch plate contact strips into engagement with both of said annular strips or only the wider one, and a pair of straight contact strips carried by said housing respectively at opposite sides of the normal transverse span of said switch plate, whereby pivotal movement of said switch plate will selectively move diagonally opposite pairs of switch plate contact strips into engagement with said straight contact strips.

2. A control switch comprising a housing having parallel spaced apart planar contact plates, a planar rectangular switch plate disposed between and parallel to said contact plates, a conducting member fixed to said switch plate and forming resilient arms projecting centrally from opposite sides thereof, said arms having bosses at the free ends thereof engaging longitudinally elongated recesses formed therefor in said contact plates, whereby said switch plate is supported for longitudinal movement and pivotal movement about an axis at right angles thereto, a contact member carried by the first of said contact plates in the recess thereof and adapted to be engaged by the corresponding arm at one position in the longitudinal movement of said switch plate, a contact member carried in a corresponding position in the recess of the second of said contact plates and adapted to be contacted by the corresponding arm, four electrically independent contact members carried by said switch plate respectively at the corners thereof, four contact strips carried by said first contact plate, and being respectively engageable by said switch plate contact members, a first pair of electrically independent contact strips carried by said second contact plate respectively at opposite ends thereof, each of said last named pair of strips being engageable by the switch plate contact members at the corresponding end of the switch plate, said corner contact members of said switch plate being adapted by longitudinal movement of said switch plate to engage neither, one, or both of said first set of strips, and a second pair of electrically independent contact strips carried by said second contact plate and disposed parallel to the normal position of said switch plate and transversely outwardly from the longitudinal edges thereof, whereby when said switch plate is pivoted in either direction, a pair of diagonally opposite contact members of said switch plate will contact said second pair of strips respectively.

ROBERT L. STEVENSON.

References Cited in the file of this patent
UNITED STATES PATENTS

| Number | Name | Date |
|---|---|---|
| 1,717,629 | Sawyer | June 8, 1919 |
| 2,086,959 | Rom | July 13, 1937 |
| 2,122,508 | Bell | July 5, 1938 |
| 2,186,911 | Erickson | Jan. 9, 1940 |
| 2,203,502 | Michel | June 4, 1940 |
| 2,305,962 | Gould | Dec. 22, 1942 |
| 2,514,604 | Hollins | July 11, 1950 |